United States Patent [19]

Seachman et al.

[11] Patent Number: 4,607,951
[45] Date of Patent: Aug. 26, 1986

[54] COMPENSATING PLATEN FOR DUAL MODE IMAGE INPUT TERMINALS

[75] Inventors: Ned J. Seachman, Penfield; Joseph P. Taillie, Rochester, both of N.Y.

[73] Assignee: Xerox Corporation, Stamford, Conn.

[21] Appl. No.: 729,516

[22] Filed: May 2, 1985

[51] Int. Cl.⁴ .................... G03B 27/48; G03B 27/50; G03B 27/70
[52] U.S. Cl. ........................................ 355/51; 355/8; 355/60
[58] Field of Search ................ 355/50, 51, 60, 8

[56] References Cited

U.S. PATENT DOCUMENTS

| | | | |
|---|---|---|---|
| 3,545,856 | 12/1970 | Limberger | 355/51 |
| 4,084,895 | 4/1978 | Ogawa et al. | 355/50 |
| 4,214,832 | 7/1980 | Kono et al. | 355/51 |
| 4,380,389 | 4/1983 | Kingsley | 355/50 |

*Primary Examiner*—Monroe H. Hayes

[57] ABSTRACT

A dual mode image input terminal having a linear scanning array with optical and illumination means supported on a carriage that, in a first scanning mode, reciprocates from a start-of-scan position to an end-of-scan position to scan a document opposite thereto on a transparent platen, and, in a second scanning mode, assumes a predetermined fixed scan position adjacent one side of the platen, with a Constant Velocity Transport (CVT) type document transport for moving the document past the fixed scan position with the document in preset spaced relation above and out of contact with the platen to avoid wear on the platen and allow room for document assisting devices ancillary to the CVT, and with the inside surface of the platen at the fixed scan position only being thicker than the remainder of the platen to raise the image focus point of the scanning array from the surface of the platen to the level of the document transported past the fixed scan position by the CVT.

5 Claims, 6 Drawing Figures

COMPENSATING PLATEN FOR DUAL MODE IMAGE INPUT TERMINALS

The invention relates to multi-function image input terminals, and more particularly to an improved platen for multi-function input terminals.

Image input terminals are devices which function to convert the image content of a document original to video image signals or pixels. Following such conversion, the image signals or pixels may be stored, or used to make copies or duplicates of the document original, or transmitted to a remote site, etc.

In the typical image input terminal, a document to be scanned is placed or brought into viewing relation with the input terminal's scanning apparatus. The typical present day scanning apparatus employs a Charge Coupled Device (CCD) type scanning array with an optical system for focusing an image line onto the scanning array and an illumination assembly with one or more lamps for illuminating the image line to be scanned. The document, in one scan mode, is supported image side down on a large transparent platen while the scanning apparatus is moved past the platen and the document thereon to scan the document image line by line from one end of the document to the other. In a second scan mode, the scanning apparatus is held stationary and the document itself is transported by a suitable document transport such as a Constant Velocity Transport (CVT) past the now-stationary scanning apparatus.

In the second scan mode, in order to move or transport the document, a nip must be established between the moving document transport roll or rolls, which are the impetus for document movement, and the platen. In time, the constant rubbing or scraping of the document against the platen plus the rubbing and scraping of the frictional surface of the transport roll against the platen when a document is not present abrades and wears the platen surface. Of particular concern is the situation where the platen surface has a special coating thereon to enhance performance. There the constant abrasion of the document and the document transport roll in time wipes away the coating. Further, direct contact of the document transport roll with the platen leaves little or no space in which to locate and support the very necessary document feeding assists such as baffles, guides, fingers, etc.

The invention seeks to obviate the above by providing, in a dual mode image input terminal having a substantially planar, generally rectangular, transparent platen for supporting, in a first scan mode, the document to be scanned; document scanning means for scanning documents through the platen, the document scanning means in the first scan mode moving relative to the platen to scan a document resting on the platen, and, in a second scan mode, being disposed in a preset fixed position at a document scanning station adjacent one edge of the platen; comprising in combination: means for transporting a document to be scanned through the document scanning station for scanning by the scanning means including at least one document feed roll; document guide means cooperable with the document feed roll to form a document feeding nip closely adjacent to the point where the scanning means scans the document, the feeding nip being spaced a predetermined distance above the platen to avoid wear on the platen; the platen being thicker at the document scanning station than the rest of the platen to retain the moving document in focus during scanning.

The invention further provides a platen for a multi-mode document scanner which in one mode supports a document to be scanned face down on a preset first scanning area of the platen, and in a second mode provides a preset second scanning area adjacent one end of the platen to permit the document to be moved past a fixed scan point during scanning, comprising: a generally rectangular plate-like member, the member being formed from a transparent rigid material to permit the document being scanned to be viewed through the member at the first and second scanning areas; the member at the first scanning area having a substantially uniform thickness of predetermined dimension; the member at the second scanning area having a substantially uniform thickness different from that of the first scanning area to enable the moving document to be scanned without touching the surface of the platen.

IN THE DRAWINGS

FIG. 1 is a side view in cross section of a dual mode image input terminal of the type in which, in a first scanning mode, a document to be scanned rests on and is scanned through a platen while being scanned line by line by a moving scanning array and, in a second scanning mode, the scanning array is parked at a fixed scan station and the document is moved therepast by a document transport and scanned through the platen;

Figure 1:
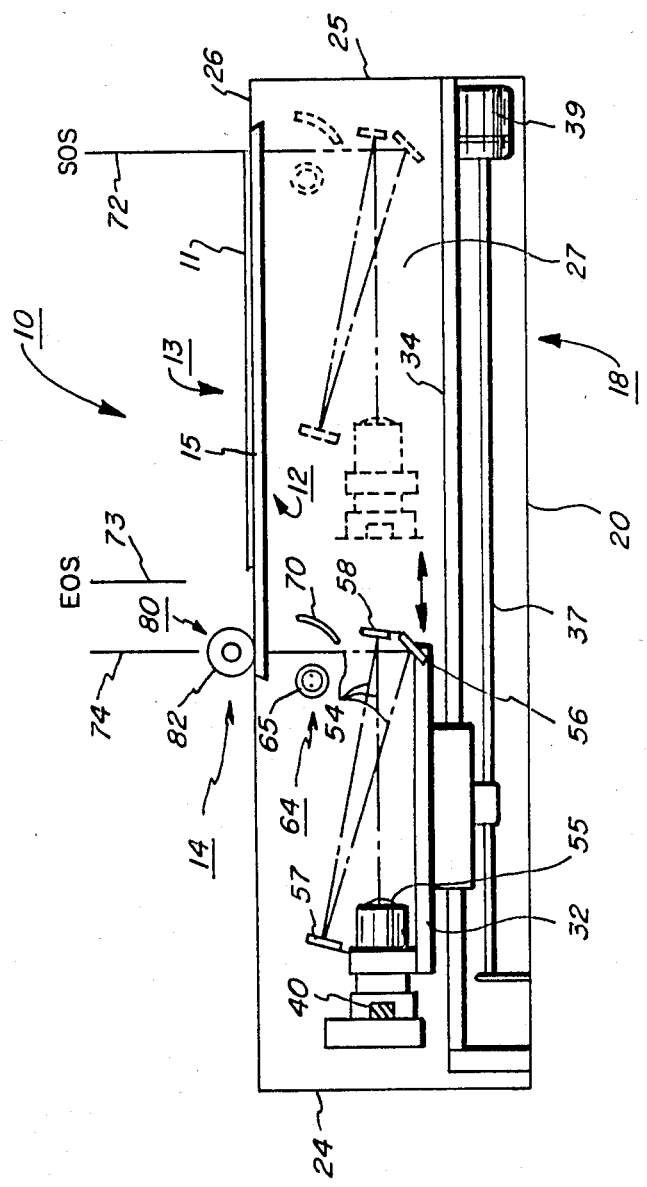
Figure 2:
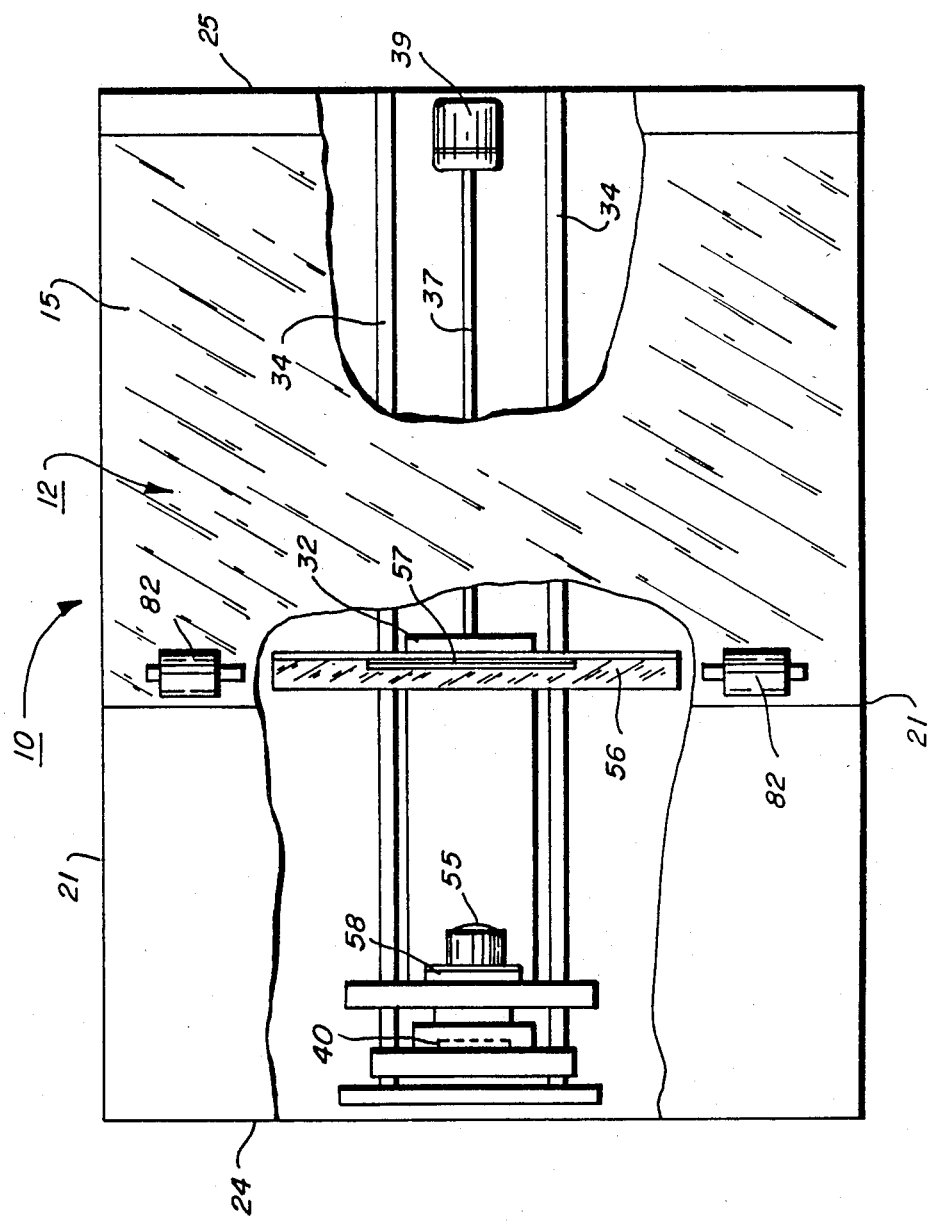
FIG. 2 is a top view of the image input terminal shown in FIG. 1.

Referring to FIGS. 1 and 2 of the drawings, there is shown an image input terminal, designated generally by the numeral 10, having a conventional platen 12. The exemplary image input terminal 10 is a multi-mode, in this case, dual mode, input terminal which in a first mode scans a document original 11 resting face down on platen 12 line by line at a first scan station 13, and in a second mode scans a moving document at a second scan station 14. As will appear more fully herein, image input terminal 10 converts the document image being scanned to video image signals or pixels which are output to a suitable user (not shown) such as a memory, communication channel, raster output scanner, etc.

Image input terminal 10 has a suitable frame or housing 18 with base member 20, side members 21, end members 24, 25 and top member 26 which cooperate with platen 12 to provide an interior 27 within which a scan carriage 32 is movably disposed. Platen 12, which is made of a suitably transparent material, normally glass, is typically rectangular in shape with a length and width sized to accommodate the largest sized document intended to be scanned by input terminal 10 in the first mode plus the platen area necessary for the second mode.

For the first mode, scan carriage 32 is supported for back and forth or reciprocating scanning movement (in the direction shown by the solid line arrow of FIG. 1) within the interior 27 of image input terminal 10 by a pair of parallel carriage support rods 34. Support rods 34 are suitably mounted on frame 18 in predetermined spaced relation below platen 12 with carriage 32 supported for slidable movement on rods 34 by suitable bearings (not shown).

To impart controlled scanning movement to carriage 32, a drive screw 37 is threadedly engaged with carriage 32. A reversible drive motor 39 rotates screw 37 in either a clockwise or counter-clockwise direction to move carriage 32 back and forth along carriage support rods 34.

A linear scanning or image reading array 40, which may for example comprise a Fairchild Model 121 H CCD chip, is mounted on carriage 32. Array 40 has a series (i.e. 1728) of individual photosensitive elements adapted to generate signals having a potential proportional to the reflectance of the object line viewed by the array 40. The signals output by array 40 are thereafter input to suitable signal processing circuitry (not shown) to provide video image signals or pixels representative of the image scanned.

An optical system consisting to imaging lens 55 and folding mirrors 56, 57, 58 cooperate to form an optical imaging path 54 through which array 40 views platen 12 and a line-like portion of the document being scanned, the light rays reflected from the document line passing downwardly through platen 12 to mirror 56 and from mirror 56 through mirrors 57, 58 to lens 55 and array 40. To illuminate the document line being scanned, an illumination assembly 64 consisting of an elongated exposure lamp 65 and cooperating reflector 70 is provided on carriage 32 adjacent the underside of platen 12. Lamp 65 and reflector 70 extend in a direction generally perpendicular to the direction of scanning movement of scan carriage 32. As will be understood, reflector 70 serves to enhance and concentrate light emitted by lamp 65 onto platen 12 and the document line being scanned by array 40.

In the first scan mode, scan carriage 32 is moved by motor 34 from a Start Of Scan (SOS) position 72 at one end of platen 12 to an End Of Scan (EOS) position 73 and back to SOS position 72. Array 40, imaging lens 55, folding mirrors 56, 57, 58, and illumination sensor 64 are fixedly attached to scan carriage 32 and move in unison with the carriage 32. EOS position 73, which cooperates with SOS position 72 to delineate first scan station 13, is slightly upstream of the platen end to leave room for second scan station 14. As will be understood, the distance between SOS and EOS positions 72, 73 respectively is chosen to accommodate the largest size document image to be scanned at first scan station 13.

In the second scan mode, scan carriage 32 is moved beyond EOS station 73 to a predetermined fixed scan position 74. During scanning in this mode, scan carriage 32 is stationary while the document being scanned is moved past the fixed scan position 74.

Figure 3:
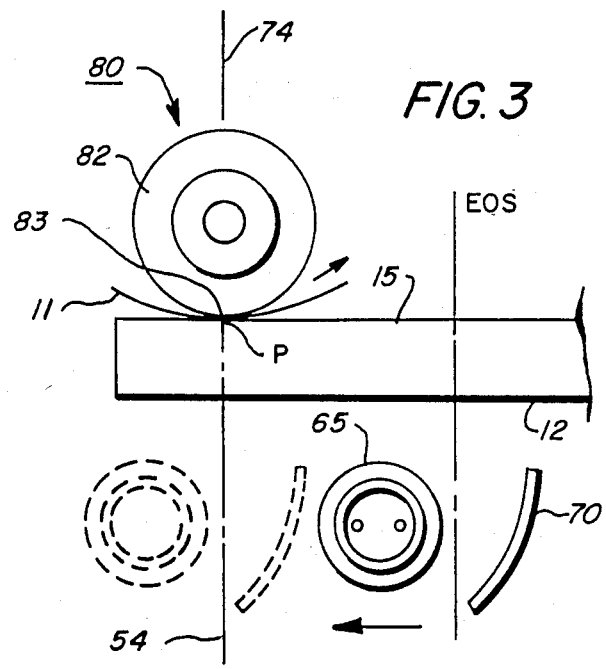
FIG. 3 is an enlarged view of the document transport for the image input terminal in FIG. 1 in which the transport document feed rolls ride against the surface of the platen opposite the fixed scan station to form a nip for feeding the document.

Referring particularly to FIG. 3, to move the document 11 to be scanned past the fixed scan position 74, a Constant Velocity Transport (CVT) 80 is provided. CVT 80 has a plurality of spaced document transport rolls 82 disposed opposite scan position 74, rolls 82 cooperating with the surface 15 of platen 12 opposite thereto to form a document feeding nip 83 therebetween. In the FIG. 3 arrangement, for scanning in the second mode, the imaging path 54 is brought to focus at a point P which is coplanar with the surface 15 of platen 12 on which the document being scanned rides.

However, in this type of scanning system, a problem results from the fact that the surface 15 of the platen 12, and any coating thereon, becomes abraded and worn in time by the constant rubbing action between the document 11 and the platen surface 15 and between the document transport rolls 82 and the platen surface 15 when no document is present in the document feeding pin 83. Additionally, since the document must contact the platen surface 15 if proper focus is to be achieved and therefore rolls 82 must in turn contact the document to effect feeding, little or no space is left under or around rolls 82 for any baffles, guides, spring fingers and the like which may be required to guide the document into, through, and out of the document feeding nip without jamming or misalignment.

Figure 4:
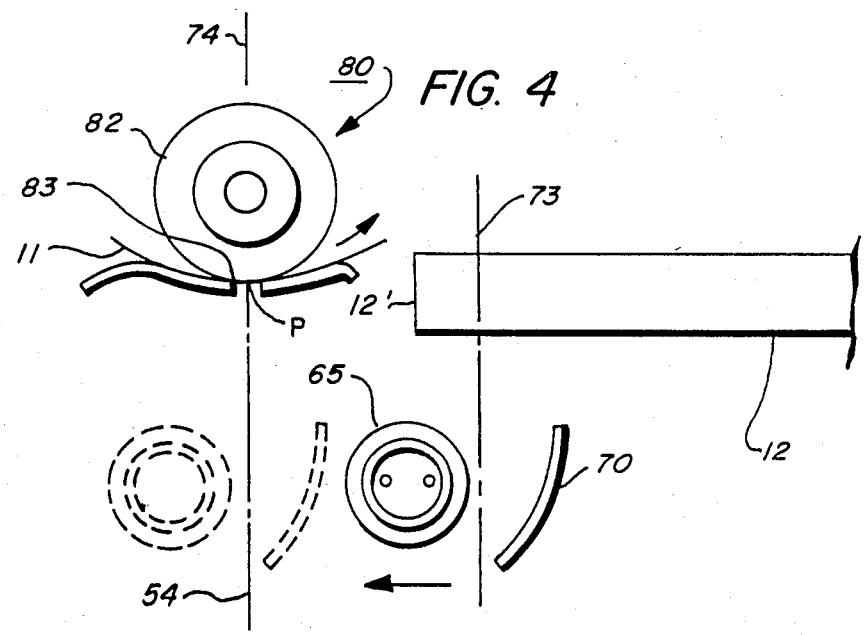
FIG. 4 is an enlarged view of an alternate document transport in which the document transport is ahead of and separate from the platen.

In the arrangement shown in FIG. 4, CVT 80 is physically separated from platen 12 to avoid any contact of either the document or the document transport rolls 82 with the platen surface 15. For this purpose, CVT 80 is moved ahead of platen 12 and at the same time the document feeding nip 83 is dropped down below the surface 15 of platen 12 to accommodate for the focal shift created by the loss of the platen to the optical system.

While the above system eliminates abrasion of the platen surface 15 and also provides space for any baffles, guides, fingers, etc. that are needed, the advantages obtained here create other problems. Now the optical components are no longer protected and shielded by platen 12. Thus dirt, dust, etc. can seep into and drop down onto the optical components, interfering with their operation and contaminating the delicate moving parts. Further, it is usually desirable to keep point P as close to EOS position 73 as possible to minimize the total travel required by scan carriage 32 since it is desirable to support the illumination assembly 64 on scan carriage 32 itself in order to locate the lamp 65 as close to the underside of platen 12 as possible and to assure synchronism between movement of the illumination assembly and scanning by array 40 during the first mode. The mechanical requirements to minimize the distance between EOS position 73 and fixed scan position 74, and the need to minimize the separation between the underside of the platen 12 and the top of the illumination assembly 64 create significant difficulty in locating mechanical support under the platen edge 12' adjacent to EOS position 73. As will be understood, without sufficient mechanical support at this platen edge, the mechanical load-bearing capacity of the platen is reduced.

Figure 5:
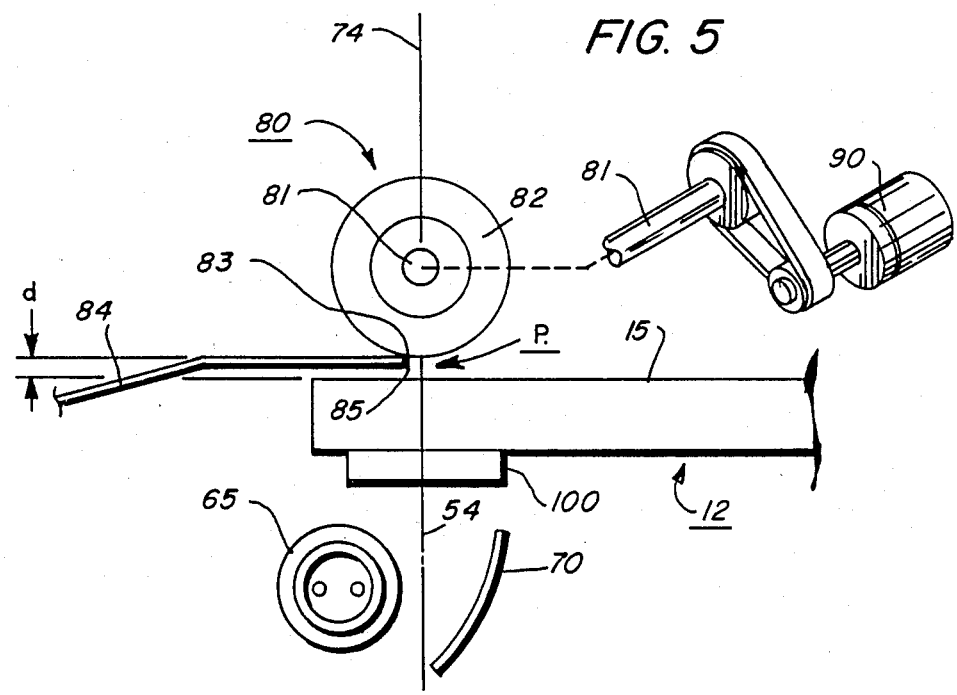
FIG. 5 is an enlarged view of the optically compensating platen of the present invention with the document transport spaced above the surface of the platen at the fixed scan station to avoid wear and damage to the platen.
Figure 6:
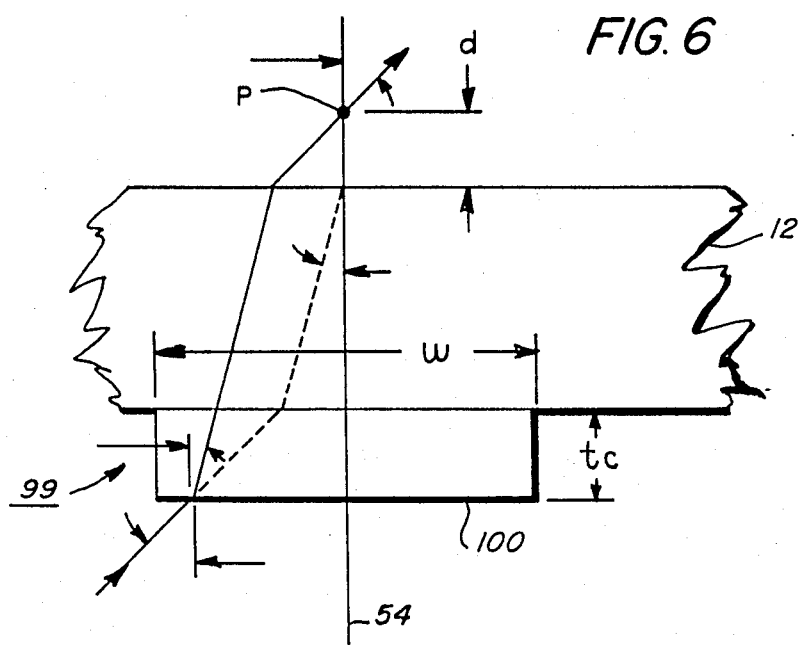
FIG. 6 is an enlarged view showing details of the optical scanning path through the platen shown in FIG. 5 at the fixed scan station.

According to the tenets of the present invention, and referring particularly to FIGS. 5 and 6 of the drawings, document transport rolls 82 of CVT 80 are carried on a shaft 81 journaled in sides 21 of housing 18 such that the lowermost portion of the rolls 82 are spaced a predetermined distance d above and hence not in contact with the platen surface 15. An elongated document guide 84 is supported by one end from housing 18 upstream of document transport rolls 82, there being one guide 84 for each roll 82. The outward or unsupported ends 85 of document guides 84 terminate just before and in closely spaced relation to the imaging path 54 to avoid interference therewith. Document guides 84 are preferably formed from a resilient or spring-like material, the unsupported ends 85 thereof riding lightly against the underside of the document transport roll 82 associated therewith. As a result, rolls 82 and document guides 84 cooperate to form the document feeding nip 83 through which the document 11 being scanned at second scan station 14 is fed. Shaft 81 of rolls 82 is driven by suitable means such as step motor 90.

Which CVT 80 spaced above the surface 15 of platen 12, room for CVT 80 and related baffles, guides, fingers, etc. such as guide 84 is provided while at the same time interference with other operating parts of input terminal 10 or with the path of movement of the document through scan station 14 is avoided. To retain the document image line in focus, platen 12 is thickened at 99 by the addition of a compensation plate 100 to the underside of platen 12 at second scan station 14. The thickness of compensation plate 100 is selected so that the object focal point P of array 40 is raised above the surface 15 of platen 12 by the amount required to allow space for CVT 80.

Preferably, compensation plate 100 is composed of the same material as platen 12 which is normally glass. Compensation plate 100 may be attached to platen 12 using any standard optical adhesive. The index of refraction of the optical adhesive preferably matches the index of refraction of compensation plate 100. The width w of compensation plate 100 is selected to assure that any extreme rays emitted from the illumination assembly are captured while the axial length of plate 100 is preferably made equal to the width of platen 12.

The shift in focal point caused by the addition of compensation plate 100 is shown in FIG. 5 and is given by the following relationship:

$$d = tc(Ng - Na)/Ng$$

where
d is the focal shift,
tc is the thickness of the glass compensator,
Ng is the refractive index of the compensator, and
Na is the refractive index of air.

For a compensation plate thickness of 6 mm, a glass refractive index of 1.5, and an air refractive index of 1.0, the object point P will be caused to move from the surface of platen 12 to a point approximately 2 mm above the platen surface.

As a result, the document transport, in this case CVT 80, is separated from the surface of platen 12 thereby avoiding rubbing contact of the document transport rolls 82 with the platen surface and providing room for any baffles, guides, fingers, etc. that may be required to assure reliable feeding and orientation of the document during scanning without the necessity of locating the document transport outside the platen area as in FIG. 4. Further, protection of the various operating components, and particulary the optical components, from dirt, dust, etc. under the cover of the platen is assured while point P at fixed scan position 74 is kept as close to EOS position 73 as possible, the latter enabling necessary support for the platen edge adjacent scan station 14 to be provided without fear of obstruction or interference with the movement of illumination assembly 64 on scan carriage 32.

While compensation plate 100 is shown and described as a separate member attached to the underside of platen 12, it will be understood that alternately an integral platen may be formed in which the end portion of the platen is thickened by a suitable amount at the point of scan of the moving document at scan station 14. Alternately, compensation plate 100 may be separated by an air gap between the bottom of platen 12 and the topmost surface of illumination assembly 64. Ordinarily, as will be understood, the gap between plate 100 and the bottom of platen 12 will be slight in order to avoid any interference between plate 100 and the support therefor with the movement of illumination assembly 64.

While the invention has been described with reference to the structure disclosed, it is not confined to the details set forth, but is intended to cover such modifications or changes as may come within the scope of the following claims.

We claim:

1. A platen for a multi-mode document scanner which in one mode supports a document to be scanned face down on a preset first scanning area of said platen for scanning by a movable scanning means, and in a second mode provides a preset second scanning area adjacent one end to permit scanning of a moving document by said scanning means when stationary, comprising:
    a generally rectangular plate-like member, said member being formed from a transparent rigid material to permit the document being scanned to be viewed through said member at said first and second scanning areas;
    said member first scanning area having a substantially uniform thickness of predetermined dimension;
    said member second scanning area having a substantially uniform thickness different from said member first scanning area to enable scanning of said moving document to occur in preset spaced relation from said member.

2. The platen according to claim 1 in which the thickness of said member second scanning area is greater than said first scanning area predetermined dimension.

3. The platen according to claim 2 in which the document support surface of said member first scanning area is coplanar with the side of said second scanning area facing said moving document.

4. In a dual mode image input terminal, the combination of:
    (a) a substantially planar generally rectangular transparent platen for supporting in a first scan mode the document to be scanned;
    (b) document scanning means for scanning documents through said platen, said document scanning means in said first scan mode moving relative to said platen to scan a document resting of said platen,
    said document scanning means in a second scan mode being disposed in a preset fixed scanning position at a document scanning station adjacent one edge of said platen;
    (c) means for transporting a document to be scanned in said second mode past said document scanning station for scanning by said scanning means, said document transport means including
        (1) a document transport roll;
        (2) document guide means cooperable with said document transport roll to form a document feeding nip opposite to and next to the point at which said scanning means scans said moving document at said document scanning station, (3) said fedding nip being spaced a predetermined distance above the surface of said platen to enable provision of said document transporting means opposite said document scanning station;

(d) said platen being thickened at said document scanning station to retain the document in focus while said document is being scanned as said document is transported through said feeding nip by said document transporting means.

5. The terminal according to claim 4 in which said platen thickened part comprises a glass element of predetermined thickness secured to the underside of said platen at said one end.

* * * * *